(12) United States Patent
Zhang et al.

(10) Patent No.: US 10,921,570 B2
(45) Date of Patent: Feb. 16, 2021

(54) CAMERA LENS ASSEMBLY

(71) Applicant: Zhejiang Sunny Optical Co., Ltd, Ningbo (CN)

(72) Inventors: Kaiyuan Zhang, Ningbo (CN); Jianke Wenren, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 399 days.

(21) Appl. No.: 15/772,873

(22) PCT Filed: Jul. 19, 2017

(86) PCT No.: PCT/CN2017/093505
§ 371 (c)(1),
(2) Date: May 2, 2018

(87) PCT Pub. No.: WO2018/192125
PCT Pub. Date: Oct. 25, 2018

(65) Prior Publication Data
US 2020/0257092 A1    Aug. 13, 2020

(30) Foreign Application Priority Data

Apr. 17, 2017  (CN) .......................... 2017 1 0248757
Apr. 17, 2017  (CN) ..................... 2017 2 0399194 U

(51) Int. Cl.
*G02B 9/62*  (2006.01)
*G02B 21/02*  (2006.01)
(Continued)

(52) U.S. Cl.
CPC ............... *G02B 13/04* (2013.01); *G02B 9/62* (2013.01); *G02B 13/0045* (2013.01)

(58) Field of Classification Search
CPC .......... G02B 9/62; G02B 21/02; G02B 13/18; G02B 13/04; G02B 9/64; G02B 13/00
(Continued)

(56) References Cited

U.S. PATENT DOCUMENTS 9,164,258 B1    10/2015  Chen et al.
2014/0118844 A1*  5/2014  Tsai ........................ G02B 13/04
                                                   359/713
(Continued)

FOREIGN PATENT DOCUMENTS

CN          101930111 A      12/2010
CN          105204143 A      12/2015
(Continued)

*Primary Examiner* — Dawayne Pinkney
(74) *Attorney, Agent, or Firm* — Sughrue Mion, PLLC

(57) ABSTRACT

The present disclosure describes a camera lens assembly. The camera lens assembly comprises, sequentially along an optical axis from an object side to an image side, the first to the seventh lenses. The first lens has a negative refractive power, and an object side surface of the first lens is a convex surface. The third lens has a positive refractive power, and an object side surface of the third lens is a convex surface. The sixth lens has a negative refractive power, and an image side surface of the sixth lens is a concave surface. The second lens, the fourth lens and the fifth lens respectively have a positive refractive power or a negative refractive power. An effective radius of the object side surface of the first lens DT11 and an effective radius of an object side surface of the second lens DT21 may satisfy: 1<DT11/DT21<1.5.

19 Claims, 10 Drawing Sheets

(51) Int. Cl.
*G02B 3/02* (2006.01)
*G02B 13/04* (2006.01)
*G02B 13/00* (2006.01)

(58) Field of Classification Search
USPC ....... 359/761, 657, 658, 713, 750–752, 755, 359/756, 762
See application file for complete search history.

(56) References Cited

U.S. PATENT DOCUMENTS

| | | |
|---|---|---|
| 2016/0124187 A1 | 5/2016 | Chen et al. |
| 2016/0178871 A1* | 6/2016 | You .................... G02B 13/0045 359/713 |
| 2017/0115470 A1* | 4/2017 | Liao ........................ G02B 9/62 |

FOREIGN PATENT DOCUMENTS

| | | |
|---|---|---|
| CN | 105204144 A | 12/2015 |
| CN | 106019535 A | 10/2016 |
| CN | 106199924 A | 12/2016 |
| CN | 106842511 A | 6/2017 |
| JP | 2012-237852 A | 12/2012 |

\* cited by examiner

CAMERA LENS ASSEMBLY

CROSS-REFERENCE TO RELATED APPLICATION

This application is a National Stage of International Application No. PCT/CN2017/093505 filed Jul. 19, 2017 which claims priorities from Chinese Patent Application Nos. 201710248757.6 and 201720399194.6, filed with the State Intellectual Property Office of the People's Republic of China (SIPO) on Apr. 17, 2017, the disclosures of which are hereby incorporated by reference in their entireties.

TECHNICAL FIELD

The present disclosure relates to a camera lens assembly, and more specifically to a wide-angle camera lens assembly including multiple lenses.

BACKGROUND

As cellphone lens assemblies develop, and demands for fields of view evolve, the cellphone lens assemblies are gradually developing toward larger fields of view and higher resolutions. However, a large field of view requires a wide-angle lens assembly, and a high resolution requires a telephoto lens assembly. To have both large fields of view and high resolutions, the wide-angle lens assembly and the telephoto lens assembly need to correlate in the dual camera technology to implement image fusion. Because of this market demand and promotion background, requirements on the wide-angle lens assembly suitable for dual cameras are also becoming higher and higher. To meet the market demands, not only miniaturization and compactness are required, but also a low aberration level and a high image quality need to be ensured.

SUMMARY

The present disclosure is intended to provide a miniaturized wide-angle camera lens assembly having a high image quality.

A camera lens assembly is provided according to an aspect of the present disclosure. The camera lens assembly includes sequentially a first lens, a second lens, a third lens, a fourth lens, a fifth lens and a sixth lens from an object side to an image side along an optical axis. The first lens has a negative refractive power, and an object side surface of the first lens is a convex surface. The third lens has a positive refractive power, and an object side surface of the third lens is a convex surface. The sixth lens has a negative refractive power, and an image side surface of the sixth lens is a concave surface. The second lens, the fourth lens and the fifth lens respectively have a positive refractive power or a negative refractive power. An effective radius of the object side surface of the first lens DT11 and an effective radius of an object side surface of the second lens DT21 may satisfy: $1<DT11/DT21<1.5$, for example, $1.346 \leq DT11/DT21 \leq 1.411$.

A camera lens assembly is provided according to another aspect of the present disclosure. The camera lens assembly may include sequentially a first lens, a second lens, a third lens, a fourth lens, and multiple subsequent lenses from an object side to an image side along an optical axis. The first lens has a negative refractive power, and an object side surface of the first lens is a convex surface. The third lens has a positive refractive power, and an object side surface of the third lens is a convex surface. The second lens and the fourth lens respectively have a positive refractive power or a negative refractive power. An effective focal length of the first lens f1 and an effective focal length of the camera lens assembly f satisfy: $-6<f1/f<-3$.

According to implementations of the present disclosure, a radius of curvature of the object side surface of the first lens R1 and a radius of curvature of the object side surface of the third lens R5 satisfy: $1<R1/R5<1.5$, for example, $1.296 \leq R1/R5 \leq 1.449$.

According to the implementations of the present disclosure, an effective focal length of the sixth lens f6 and the effective focal length of the camera lens assembly f satisfy: $-1<f6/f<-0.5$, for example, $-0.641 \leq f6/f \leq -0.574$.

According to the implementations of the present disclosure, an object side surface of the sixth lens is a concave surface. The radius of curvature of the object side surface of the first lens R1 and a radius of curvature of the object side surface of the sixth lens R11 satisfy: $-1.2<R1/R11<-0.7$, for example, $-1.125 \leq R1/R11 \leq -0.867$.

According to the implementations of the present disclosure, a distance from the object side surface of the first lens to an image plane on the optical axis TTL and ImgH, ImgH being half a diagonal length of an effective pixel area of an electronic photosensitive element, satisfy: $TTL/ImgH<1.8$, for example, $TTL/ImgH \leq 1.728$.

According to the implementations of the present disclosure, the effective radius of the object side surface of the first lens DT11 and ImgH, ImgH being half a diagonal length of an effective pixel area of an electronic photosensitive element, satisfy: $0.3<DT11/ImgH<0.6$, for example, $0.397 \leq DT11/ImgH \leq 0.421$.

According to the implementations of the present disclosure, the effective focal length of the first lens f1 and an effective focal length of the third lens f3 satisfy: $-10<f1/f3<-5$, for example, $-8.568 \leq f1/f3 \leq -6.476$.

According to the implementations of the present disclosure, a center thickness of the first lens on the optical axis CT1 and a center thickness of the second lens on the optical axis CT2 satisfy: $0.6<CT1/CT2<1.2$, for example, $0.717 \leq CT1/CT2 \leq 1.03$.

According to the implementations of the present disclosure, a center thickness of the third lens on the optical axis CT3 and a center thickness of the fifth lens on the optical axis CT5 satisfy: $0.8<CT3/CT5<1.3$, for example, $0.924 \leq CT3/CT5 \leq 1.214$.

According to the implementations of the present disclosure, an image side surface of the first lens is a concave surface, and an image side surface of the third lens is a convex surface.

According to the implementations of the present disclosure, a spacing distance between the fourth lens and the fifth lens on the optical axis T45 and a spacing distance between the fifth lens and the sixth lens on the optical axis T56 satisfy: $0.5<145/156<1$, for example, $0.803 \leq T45/T56 \leq 0.902$.

According to the implementations of the present disclosure, a spacing distance between the first lens and the second lens on the optical axis and the spacing distance between the fourth lens and the fifth lens on the optical axis T45 satisfy: $0.8<112/145<1.3$, for example, $0.994 \leq T12/T45 \leq 1.214$.

In the present disclosure, multiple lenses (e.g., six lenses) are used. By reasonably distributing the refractive powers, surface types of the lenses, the axial spacing distances between the lenses, etc., the camera lens assembly may possess at least one of the following advantages:

shortening a total length of the lens assembly;

ensuring an effective clear diameter and miniaturization of the lens assembly;

ensuring an image height and an overall refractive power of the system;

ensuring compactness of the system and a larger field-of-view angle;

correcting various aberrations; and improving an image quality of the lens assembly.

BRIEF DESCRIPTION OF THE DRAWINGS

The above and other advantages of the implementations of the present disclosure will become apparent through detailed description given with reference to the accompanying drawings, and the accompanying drawings are intended to illustrate the exemplary implementations of the present disclosure, rather than a limitation to the exemplary implementations of the present disclosure. In the accompanying drawings.

DETAILED DESCRIPTION OF EMBODIMENTS

Figure 1:
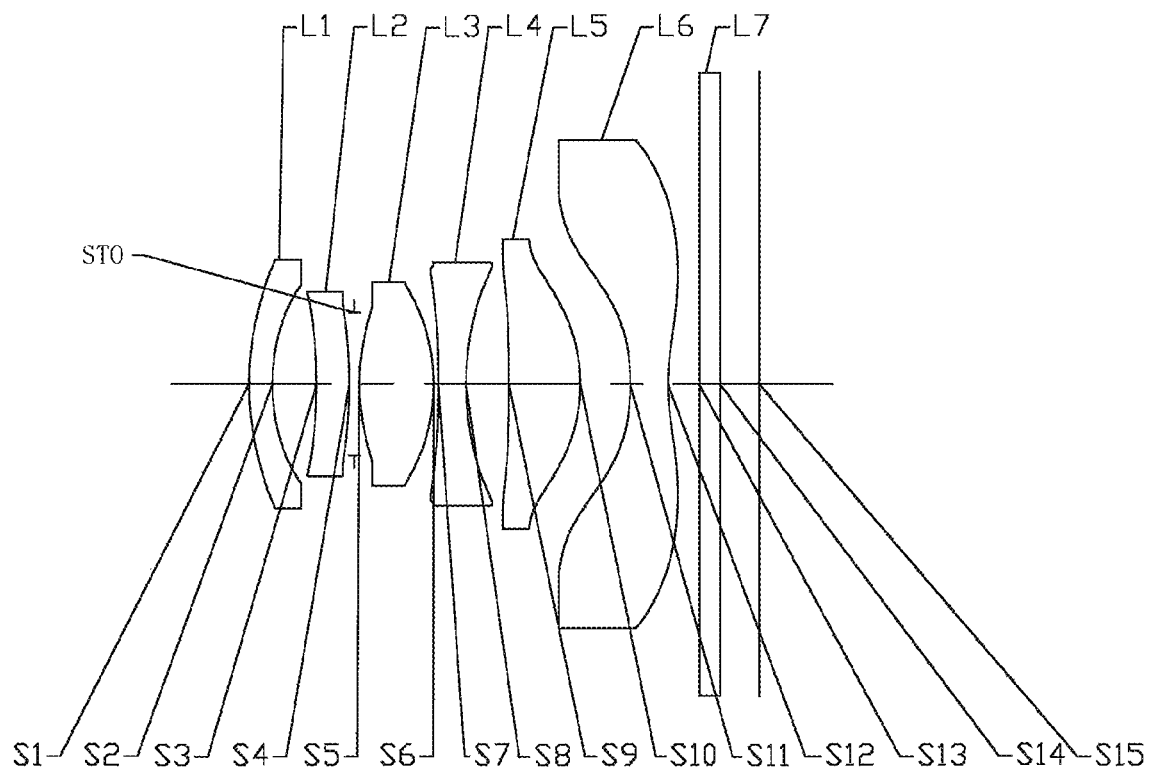
FIG. 1 illustrates a schematic structural diagram of a camera lens assembly according to Embodiment 1 of the present disclosure.

Various aspects of the present disclosure will be described in more detail with reference to the accompanying drawings, so as to better understand the present disclosure. It should be appreciated that the detailed description is merely an explanation for exemplary implementations of the present disclosure, rather than a limitation to the scope of the present disclosure in any way. The same reference numerals designate the same elements throughout this specification. The expression "and/or" includes any and all combinations of one or more of the associated listed items.

It should be noted that, in the specification, expressions, such as "first," "second" and "third" are merely used to distinguish one feature from another feature, not to represent any limitations to the feature. Thus, a first lens discussed below may also be termed a second lens or a third lens without departing from the teachings of the present disclosure.

In the accompanying drawings, for the convenience of explanation, the thicknesses, sizes and shapes of lenses have been slightly exaggerated. However, it should be appreciated that sizes of various components may be adjusted in a certain range, without being defined by the accompanying drawings. Specifically, shapes of spherical surfaces or aspheric surfaces shown in the accompanying drawings are illustrated by way of examples. That is, shapes of the spherical surfaces or aspheric surfaces are not limited to the shapes of the spherical surfaces or the aspheric surfaces shown in the accompanying drawings. The accompanying drawings are merely examples, not strictly drawn to scale.

In addition, a paraxial area indicates an area near an optical axis. The first lens is a lens closest to an object, and a sixth lens is a lens closest to a photosensitive element. In the present disclosure, a surface closest to the object in each lens is referred to as an object side surface, and a surface closest to an image plane in each lens is referred to as an image side surface.

It should be further understood that the terms "comprising," "including," "having" and variants thereof, when used in this specification, specify the presence of stated features, entireties, steps, operations, elements and/or components, but do not preclude the presence or addition of one or more other features, entireties, steps, operations, elements, components and/or combinations thereof. In addition, expressions, such as "at least one of," when preceding a list of elements, modify the entire list of elements rather than an individual element in the list. Further, the use of "may", when describing implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The present disclosure provides a camera lens assembly. According to exemplary implementations of the present disclosure, the camera lens assembly may include sequentially a first lens, a second lens, a third lens, a fourth lens, a fifth lens and a sixth lens from an object side to an image side along an optical axis. The camera lens assembly may have an effective focal length f.

In the exemplary implementations, the first lens has a negative refractive power, and an object side surface of the first lens is a convex surface. The third lens has a positive refractive power, and an object side surface of the third lens is a convex surface. The sixth lens has a negative refractive power, and an object side surface of the sixth lens is a concave surface. The second lens, the fourth lens and the fifth lens may respectively have a refractive power. Alternatively, the second lens may have a positive refractive power or a negative refractive power. Alternatively, the fourth lens may have a positive refractive power or a negative refractive power. Alternatively, the fifth lens may have a positive refractive power or a negative refractive power.

In the exemplary implementations, an image side surface of the first lens is a concave surface, and an image side surface of the third lens is a convex surface. By reasonably distributing refractive powers and surface types of the lenses, a primary aberration of the system becomes more reasonable. The image side surface of the first lens is set to be a concave surface, which is conducive to shortening a total length of the camera lens assembly and reducing a volume of the camera lens assembly, thereby achieving miniaturization of the lens assembly.

In practice, by reasonably and effectively distributing refractive powers of the lenses, the primary aberration and a system longitudinal aberration and lateral color can be effectively controlled, thereby effectively improving an image performance of the camera lens assembly and ensuring compactness of the lens assembly and a large field-of-view angle at the same time. For example, in the exemplary implementations, an effective focal length of the first lens f1 and the effective focal length of the camera lens assembly f satisfy: $-6<f1/f<-3$, and more specifically, may satisfy: $-5.145 \leq f1/f \leq -3.828$. For another example, the effective focal length of the first lens f1 and an effective focal length of the third lens f3 satisfy: $-10<f1/f3<-5$, and more specifically, may satisfy: $-8.568 \leq f1/f3 \leq -6.476$. By controlling the refractive power of the first lens in the above reasonable interval, a spherical aberration and a comatic aberration of the system can be effectively controlled. For another example, an effective focal length of the sixth lens f6 and the effective focal length of the camera lens assembly f satisfy: $-1<f6/f<-0.5$, and more specifically, may satisfy: $-0.641 \leq f6/f \leq -0.574$. By reasonably distributing the refractive power of the sixth lens, the overall refractive power and the image height of the system can be effectively ensured.

In practice, a center thickness of each lens on the optical axis may be optimized. A size structure of each lens in the camera lens assembly is reasonably arranged, which helps to control a spherochromatic aberration of the camera lens assembly, so that the distortion of the camera lens assembly is controlled in a reasonable interval. Meanwhile, a compression of the lens assembly of a lateral size may also be achieved, thereby ensuring the compactness and the miniaturization of the lens assembly. For example, in the exemplary implementations, a center thickness of the first lens on the optical axis CT1 and a center thickness of the second lens on the optical axis CT2 may satisfy: $0.6<CT1/CT2<1.2$, and more specifically, may satisfy: $0.717 \leq CT1/CT2 \leq 1.03$. By reasonably distributing the center thickness of the first lens and the center thickness of the second lens, the spherochromatic aberration of the camera lens assembly may be effectively controlled. For another example, a center thickness of the third lens on the optical axis CT3 and a center thickness of the fifth lens on the optical axis CT5 satisfy: $0.8<CT3/CT5<1.3$, and more specifically, may satisfy: $0.924 \leq CT3/CT5 \leq 1.214$. By reasonably distributing the thicknesses of the third lens and the fifth lens, the distortion of the camera lens assembly can be effectively controlled in a reasonable interval.

In practice, by reasonably distributing radii of curvature and shapes of the lenses, relative illuminations can be effectively improved, which helps to correct aberrations, so that the camera lens assembly possesses a high image quality. For example, in the exemplary implementations, a radius of curvature of the object side surface of the first lens R1 and a radius of curvature of the object side surface of the sixth lens R11 may satisfy: $-1.2<R1/R11<-0.7$, and more specifically, may satisfy: $-1.125 \leq R1/R11 \leq -0.867$. By controlling the intervals of radii of curvature of the first lens and the sixth lens, the amount of an astigmatic of the camera lens assembly can be effectively controlled. For another example, the radius of curvature of the object side surface of the first lens R1 and a radius of curvature of the object side surface of the third lens R5 may satisfy: $1<R1/R5<1.5$, and more specifically, may satisfy: $1.296 \leq R1/R5 \leq 1.449$. By controlling the radius of curvature of the object side surface of the first lens and the radius of curvature of the object side surface of the third lens, an effective balance of a low-order aberration and an effective improvement of the image quality are achieved.

In order to ensure the structural positioning stability of the camera lens assembly during assembling, and avoid the bending deformation caused by a difference of positioning diameters of the first lens and the second lens, an effective radius of the object side surface of the first lens DT11 and an effective radius of the object side surface of the second lens DT21 may be configured to satisfy: $1<DT11/DT21<1.5$, and more specifically, may satisfy: $1.34 \leq DT11/DT21 \leq 1.411$. By constraining the radii of the object side surfaces of the first lens and the second lens, the miniaturization of the camera lens assembly may be effectively achieved, to reduce a weight of the system.

In the exemplary implementations, a distance from the object side surface of the first lens to an image plane on the optical axis TTL and ImgH, ImgH being half a diagonal length of an effective pixel area of an electronic photosensitive element, satisfy: $TTL/ImgH<1.8$, and more specifically, may satisfy: $TTL/ImgH \leq 1.728$. By constraining the ratio of TTL and the image height, the compactness of the system can be effectively controlled.

In the exemplary implementations, the effective radius of the object side surface of the first lens DT11 and ImgH, ImgH being half a diagonal length of an effective pixel area of an electronic photosensitive element, satisfy: $0.3<DT11/$ ImgH<0.6, and more specifically, may satisfy: 0.397≤DT11/ImgH≤0.421. By optimizing the diameter of the first lens, the diameter of an open in the front end surface of an optical camera lens assembly can be effectively reduced, so that the aesthetic performance of the front end surface may be effectively improved, when the camera lens assembly is applied to front cameras of cell phones.

In the exemplary implementations, a spacing distance between the first lens and the second lens on the optical axis and a spacing distance between the fourth lens and the fifth lens on the optical axis T45 satisfy: 0.8<T12/T45<1.3, and more specifically, may satisfy: 0.994≤T12/T45≤1.214. By controlling the ratio of the spacing distance between the first and second lenses and the spacing distance between the fourth and fifth lenses, a contribution rate of a fifth-order spherical aberration of the camera lens assembly can be effectively controlled, and then the sensitivity of the camera lens assembly may be effectively controlled.

In the exemplary implementations, the spacing distance between the fourth lens and the fifth lens on the optical axis T45 and a spacing distance between the fifth lens and the sixth lens on the optical axis T56 satisfy: 0.5<I45/I56<1, and more specifically, may satisfy: 0.803≤T45/T56≤0.902. By controlling the spacing distances between the fourth and fifth lenses and between the fifth and sixth lenses in the above ranges, the field curvature of the camera lens assembly can be effectively controlled.

The camera lens assembly according to the above implementations of the present disclosure may use multiple lenses (e.g., six lenses used in the present disclosure.) However, it should be appreciated that the camera lens assembly including six lenses is merely an example, rather than a limitation. By reasonably distributing the refractive powers, center thicknesses and surface types of the various lenses, the axial spacing distances between the lenses, and so on, a compact-type camera lens assembly having high brightness and high resolution may be provided. In the implementations of the present disclosure, at least one of the mirror surfaces of the lenses is an aspheric mirror surface. An aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has the advantages of improving a distortion aberration and an astigmatic aberration, which can make the visual field larger and more realistic. The use of the aspheric lens can eliminate as much as possible the aberration that occurs during imaging, thereby improving the image quality.

However, it should be understood by those skilled in the art that, in a situation without departing from the technical solution claimed by the present disclosure, the number of lenses forming the lens assembly may be changed, to obtain the various results and advantages described below. For instance, in the description of the Embodiment 1, a camera lens assembly having six lenses is described as an example, but the camera lens assembly is not limited to include six lenses. If necessary, the camera lens assembly may also include other numbers of lenses.

Specific embodiments applicable to the camera lens assembly of the above implementations will be further described below with reference to the accompanying drawings.

Embodiment 1

Embodiment 1 of the camera lens assembly according to the above implementations of the present disclosure will be described below with reference to FIG. 1 to FIG. 2D. FIG. 1 illustrates a schematic structural diagram of a camera lens assembly according to Embodiment 1 of the present disclosure.

As shown in FIG. 1, the camera lens assembly in Embodiment 1 includes, along an optical axis, six lenses L1-L6 arranged in sequence from an object side to an image side. A first lens L1 has an object side surface S1 and an image side surface S2, a second lens L2 has an object side surface S3 and an image side surface S4, a third lens L3 has an object side surface S5 and an image side surface S6, a fourth lens L4 has an object side surface S7 and an image side surface S8, a fifth lens L5 has an object side surface S9 and an image side surface S10, and a sixth lens L6 has an object side surface S11 and an image side surface S12. In this embodiment, the first lens may have a negative refractive power, the object side surface S1 of the first lens is a convex surface, and the image side surface S2 of the first lens is a concave surface. The third lens has a positive refractive power, the object side surface S5 of the third lens is a convex surface, and the image side surface S6 of the third lens is a convex surface. The sixth lens may have a negative refractive power, and the image side surface S12 of the sixth lens is a concave surface. The second lens, the fourth lens and the fifth lens may respectively have a positive refractive power or a negative refractive power. The camera lens assembly may also be provided with a filter L7 for filtering out infrared light and having an object side surface S13 and an image side surface S14. In the camera lens assembly of the present embodiment, an aperture STO is also arranged between the second lens and the third lens, to adjust the amount of light admitted. Light from an object sequentially passes through the surfaces S1 to S14 and finally forms an image on an image plane S15.

Table 1 below shows the effective focal lengths of the lenses f1-f6, the effective focal length of the camera lens assembly f, the half of the maximum field-of-view angle of the camera lens assembly HFOV, the f-number of the camera lens assembly Fno and the total length of the camera lens TTL in Embodiment 1.

TABLE 1

| | Parameter | | | | |
|---|---|---|---|---|---|
| | HFOV (°) | Fno | f (mm) | f1 (mm) | f2 (mm) |
| Numerical Value | 51.396 | 2.55 | 3.209 | −15.590 | 220.744 |

| | Parameter | | | | |
|---|---|---|---|---|---|
| | f3 (mm) | f4 (mm) | f5 (mm) | f6 (mm) | TTL (mm) |
| Numerical Value | 1.916 | −3.437 | 2.839 | −1.942 | 5.200 |

Referring to Table 1, the effective focal length of the first lens f1 and the effective focal length of the third lens f3 satisfy: f1/f3=−8.137. The effective focal length of the first lens f1 and the effective focal length of the camera lens assembly f satisfy: f1/f=−0.605. The effective focal length of the sixth lens f6 and the effective focal length of the camera lens assembly f satisfy: f6/f=−0.605.

Table 2 shows the surface types, the radii of curvature, the thicknesses, the materials and the conic coefficients of the lenses in Embodiment 1.

TABLE 2

| Surface Number | Surface Type | Radius of Curvature | Thickness | Material Refractive Index | Abbe Number | Conic Coefficient |
|---|---|---|---|---|---|---|
| OBJ | spherical | infinite | infinite | | | |
| S1 | aspheric | 2.5612 | 0.2400 | 1.546 | 56.11 | 2.3630 |
| S2 | aspheric | 1.9036 | 0.4498 | | | 1.0548 |
| S3 | aspheric | −4.2216 | 0.3347 | 1.645 | 23.53 | −25.7170 |
| S4 | aspheric | −4.2274 | 0.0500 | | | 1.7977 |
| STO | spherical | infinite | 0.0500 | | | |
| S5 | aspheric | 1.9763 | 0.7569 | 1.546 | 56.11 | −5.5080 |
| S6 | aspheric | −1.9214 | 0.0500 | | | 1.5718 |
| S7 | aspheric | −60.6008 | 0.2800 | 1.645 | 23.53 | 95.0000 |
| S8 | aspheric | 2.3037 | 0.4383 | | | −1.8515 |
| S9 | aspheric | −61.7316 | 0.7288 | 1.536 | 55.80 | 27.8912 |
| S10 | aspheric | −1.4931 | 0.5073 | | | −1.4359 |
| S11 | aspheric | −2.5600 | 0.3840 | 1.536 | 55.80 | 0.8253 |
| S12 | aspheric | 1.8500 | 0.3182 | | | −8.8422 |
| S13 | spherical | infinite | 0.2120 | 1.517 | 64.17 | |
| S14 | spherical | infinite | 0.4000 | | | |
| S15 | spherical | infinite | | | | |

Referring to Table 2, the radius of curvature of the object side surface of the first lens R1 and the radius of curvature of the object side surface of the sixth lens R11 satisfy: R1/R11=−1. The center thickness of the first lens on the optical axis CT1 and the center thickness of the second lens on the optical axis CT2 satisfy: CT1/CT2=0.717. The spacing distance between the first lens and the second lens on the optical axis and the spacing distance between the fourth lens and the fifth lens on the optical axis T45 satisfy: T12/T45=1.026. The radius of curvature of the object side surface of the first lens R1 and the radius of curvature of the object side surface of the third lens R5 satisfy: R1/R5=1.296. The center thickness of the third lens on the optical axis CT3 and the center thickness of the fifth lens on the optical axis CT5 satisfy: CT3/CT5=1.04. The spacing distance between the fourth lens and the fifth lens on the optical axis T45 and the spacing distance between the fifth lens and the sixth lens on the optical axis T56 satisfy: T45/T56=0.864.

In this embodiment, a camera lens assembly having six lenses is used as an example. By reasonably distributing the focal lengths and the surface types of the six lenses, an aperture of the lens assembly is effectively enlarged, and a total length of the lens assembly is effectively reduced, thereby ensuring a large aperture and miniaturization of the lens assembly. Meanwhile, various aberrations are corrected, thereby improving the resolution and the image quality of the lens assembly. A surface type of each aspheric surface x is defined by the following formula:

$$x = \frac{ch^2}{1 + \sqrt{1 - (k+1)c^2h^2}} + \sum A i h^i. \tag{1}$$

When an aspheric surface is at a height h along the optical axis, x is the distance sagittal height to the vertex of the aspheric surface; c is the paraxial curvature of the aspheric surface, and c=1/R (i.e., the paraxial curvature c is the reciprocal of the radius of curvature R in Table 1 above); k is the conic coefficient (given in Table 1 above); and Ai is the correction coefficient of the i-th order of the aspheric surface. Table 3 below shows the high-order coefficients $A_4$, $A_6$, $A_8$, $A_{10}$, $A_{12}$, $A_{14}$, $A_{16}$, $A_{18}$ and $A_{20}$ that can be applied to the spherical or aspheric surfaces S1-S12 of the lenses in Embodiment 1.

TABLE 3

| Surface Number | A4 | A6 | A8 | A10 | A12 |
|---|---|---|---|---|---|
| S1 | −2.1677E−02 | −6.6161E−02 | 1.5102E−01 | −3.5451E−01 | 5.5995E−01 |
| S2 | 3.9676E−02 | −2.4193E−01 | 1.3752E+00 | −5.5038E+00 | 1.3896E+01 |
| S3 | 1.6608E−02 | −4.8645E−02 | −5.4010E−01 | 2.8261E+00 | −7.8722E+00 |
| S4 | 9.3730E−02 | −5.4882E−01 | 2.1863E+00 | −7.4796E+00 | 1.8991E+01 |
| S5 | 1.1005E−01 | −3.3374E−01 | 2.6718E−01 | 3.2093E+00 | −1.9095E+01 |
| S6 | −1.0125E−01 | 5.4029E−01 | −1.6788E+00 | 2.6524E+00 | −6.6467E−02 |
| S7 | −2.5617E−01 | 8.3046E−01 | −2.4899E+00 | 5.2073E+00 | −7.0624E+00 |
| S8 | −1.2328E−02 | 3.4258E−01 | −5.7894E−01 | 7.7190E−01 | −8.3452E−01 |
| S9 | −5.6523E−02 | −7.8366E−04 | 5.5946E−02 | −1.9781E−01 | 4.2773E−01 |
| S10 | −1.9864E−02 | −4.7810E−02 | 6.2291E−03 | 1.5898E−01 | −3.1048E−01 |
| S11 | −2.7178E−01 | 1.7859E−01 | 2.8483E−02 | −1.3823E−01 | 1.3207E−01 |
| S12 | −1.8661E−01 | 1.6428E−01 | −1.0709E−01 | 4.9630E−02 | −1.6093E−02 |

| Surface Number | A14 | A16 | A18 | A20 |
|---|---|---|---|---|
| S1 | −5.4120E−01 | 3.1512E−01 | −1.0255E−01 | 1.4305E−02 |
| S2 | −2.1893E+01 | 2.1048E+01 | −1.1271E+01 | 2.5647E+00 |

TABLE 3-continued

| | | | | |
|---|---|---|---|---|
| S3 | 1.3698E+01 | −1.4675E+01 | 8.8659E+00 | −2.3074E+00 |
| S4 | −3.1369E+01 | 3.0813E+01 | −1.5376E+01 | 2.6056E+00 |
| S5 | 5.3632E+01 | −8.5315E+01 | 7.3738E+01 | −2.6949E+01 |
| S6 | −7.7676E+00 | 1.4581E+01 | −1.1932E+01 | 3.8188E+00 |
| S7 | 6.0280E+00 | −2.7858E+00 | 3.6107E−01 | 1.0877E−01 |
| S8 | 8.5389E−01 | −7.4297E−01 | 4.0775E−01 | −9.8066E−02 |
| S9 | −4.9531E−01 | 3.2702E−01 | −1.1784E−01 | 1.7996E−02 |
| S10 | 2.9069E−01 | −1.3521E−01 | 2.8727E−02 | −2.0162E−03 |
| S11 | −6.7268E−02 | 1.9511E−02 | −3.0461E−03 | 1.9993E−04 |
| S12 | 3.5393E−03 | −5.0141E−04 | 4.1249E−05 | −1.4973E−06 |

Referring to Tables 1-3, the effective radius of the object side surface of the first lens DT11 and the effective radius of the object side surface of the second lens DT21 satisfy: DT11/DT21=1.346. The distance from the object side surface of the first lens to the image plane on the optical axis TTL and ImgH, ImgH being half a diagonal length of an effective pixel area of an electronic photosensitive element, satisfy: TTL/ImgH=1.728. The effective radius of the object side surface of the first lens DT11 and ImgH, ImgH being half a diagonal length of an effective pixel area of an electronic photosensitive element, satisfy: DT11/ImgH=0.397.

Figure 2A:
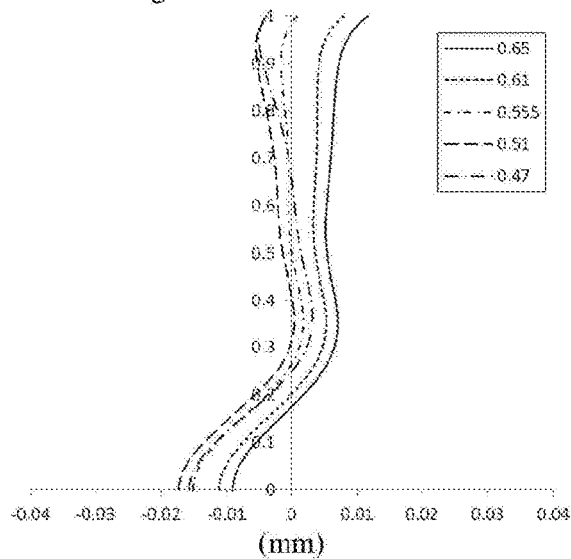
FIG. 2A illustrates a longitudinal aberration curve of the camera lens assembly according to Embodiment 1.
Figure 2B:
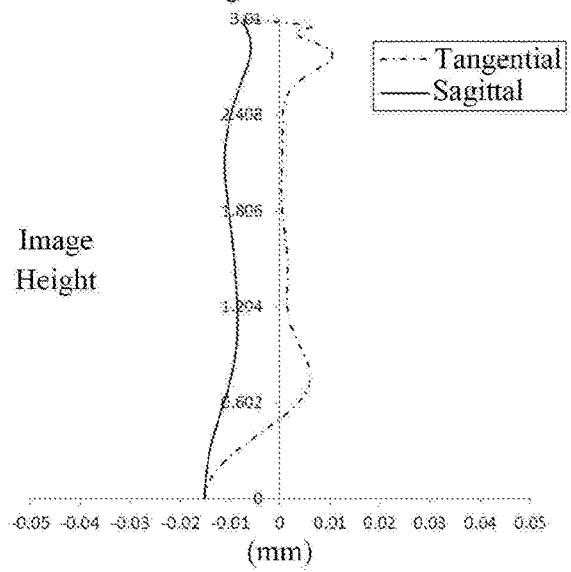
FIG. 2B illustrates an astigmatic curve of the camera lens assembly according to Embodiment 1.
Figure 2C:
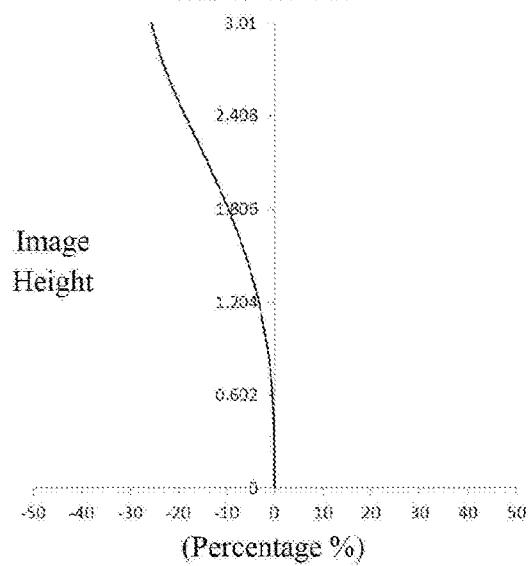
FIG. 2C illustrates a distortion curve of the camera lens assembly according to Embodiment 1.
Figure 2D:
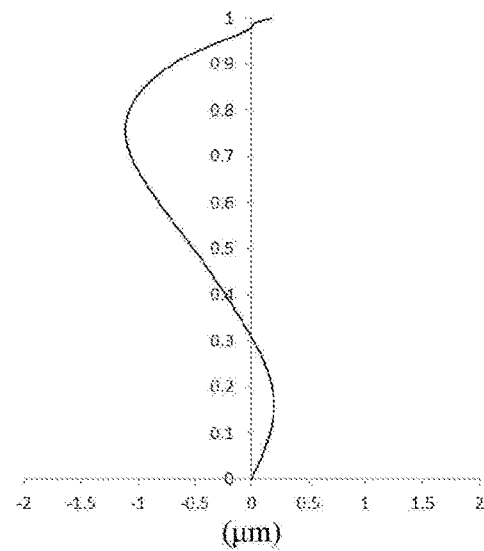
FIG. 2D illustrates a lateral color curve of the camera lens assembly according to Embodiment 1.

FIG. 2A illustrates a longitudinal aberration curve of the camera lens assembly according to Embodiment 1, representing deviations of focal points of light of different wavelengths converged after passing through the optical system. FIG. 2B illustrates an astigmatic curve of the camera lens assembly according to Embodiment 1, representing a curvature of a tangential image plane and a curvature of a sagittal image plane. FIG. 2C illustrates a distortion curve of the camera lens assembly according to Embodiment 1, representing amounts of distortion at different viewing angles. FIG. 2D illustrates a lateral color curve of the camera lens assembly according to Embodiment 1, representing deviations of different image heights on an image plane after light passes through the camera lens assembly. In summary, it can be seen from FIGS. 2A-2D that the camera lens assembly according to Embodiment 1 may achieve a wide-angle imaging effect of a high image quality in a situation where the compactness and the miniaturization of the camera lens assembly are ensured.

Embodiment 2

Embodiment 2 of the above camera lens assembly according to the present disclosure will be described below with reference to FIG. 3 to FIG. 4D. In addition to the parameters of each lens of the camera lens assembly, for example, in addition to the radius of curvature, the thickness, the conic coefficient, the effective focal length and the axial spacing distance of each lens, and the high-order coefficients of each mirror surface, the arrangement and struction of the camera lens assembly described in Embodiment 2 and the following embodiments is the same as that in Embodiment 1. For the purpose of brevity, the description of parts similar to those in Embodiment 1 will be omitted.

Figure 3:
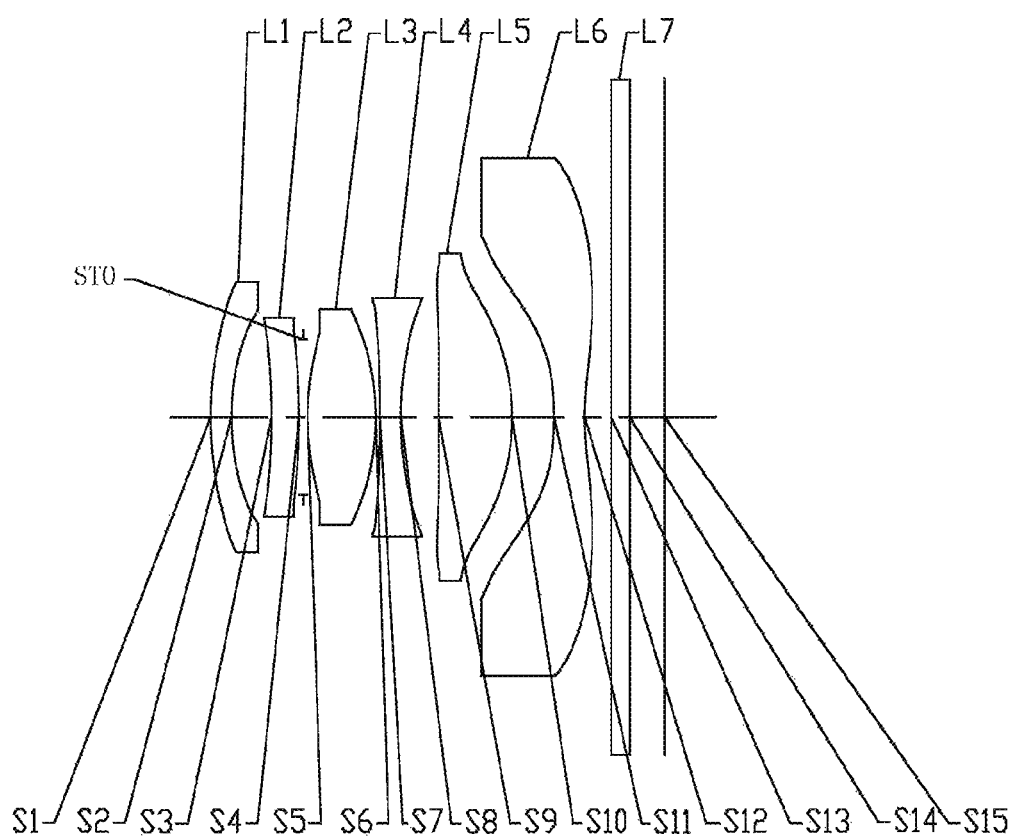
FIG. 3 illustrates a schematic structural diagram of a camera lens assembly according to Embodiment 2 of the present disclosure.

FIG. 3 illustrates a schematic structural diagram of a camera lens assembly according to Embodiment 2 of the present disclosure. As shown in FIG. 3, the camera lens assembly according to Embodiment 2 includes the first to sixth lenses L1-L6 respectively having an object side surface and an image side surface.

Table 4 below shows the effective focal lengths of the lenses f1-f6, the effective focal length of the camera lens assembly f, the half of the maximum field-of-view angle of the camera lens assembly HFOV, the f-number of the camera lens assembly Fno and the total length of the camera lens assembly TTL in Embodiment 2.

TABLE 4

| | Parameter | | | | |
|---|---|---|---|---|---|
| | HFOV (°) | Fno | f (mm) | f1 (mm) | f2 (mm) |
| Numerical Value | 51.382 | 2.54 | 3.209 | −15.656 | −551.076 |
| | Parameter | | | | |
| | f3 (mm) | f4 (mm) | f5 (mm) | f6 (mm) | TTL (mm) |
| Numerical Value | 1.882 | −3.395 | 2.746 | −1.842 | 5.200 |

Table 5 shows the surface types, the radii of curvature, the thicknesses, the materials and the conic coefficients of the lenses in Embodiment 2.

TABLE 5

| Surface Number | Surface Type | Radius of Curvature | Thickness | Material Refractive Index | Material Abbe Number | Conic Coefficient |
|---|---|---|---|---|---|---|
| OBJ | spherical | infinite | infinite | | | |
| S1 | aspheric | 2.5681 | 0.2400 | 1.546 | 56.11 | 2.4138 |
| S2 | aspheric | 1.9096 | 0.4584 | | | 1.3428 |
| S3 | aspheric | −4.3769 | 0.3130 | 1.645 | 23.53 | −30.4628 |
| S4 | aspheric | −4.5557 | 0.0500 | | | −2.1756 |
| STO | spherical | infinite | 0.0500 | | | |
| S5 | aspheric | 1.9395 | 0.7773 | 1.546 | 56.11 | −5.3719 |
| S6 | aspheric | −1.8767 | 0.0500 | | | 0.9001 |
| S7 | aspheric | −86.8125 | 0.2400 | 1.645 | 23.53 | 95.0000 |
| S8 | aspheric | 2.2477 | 0.4326 | | | −1.6134 |
| S9 | aspheric | 21.0800 | 0.8416 | 1.536 | 55.80 | −78.0788 |
| S10 | aspheric | −1.5628 | 0.4795 | | | −1.2123 |
| S11 | aspheric | −2.2820 | 0.3500 | 1.546 | 56.11 | 0.8884 |

TABLE 5-continued

| Surface Number | Surface Type | Radius of Curvature | Thickness | Material Refractive Index | Material Abbe Number | Conic Coefficient |
|---|---|---|---|---|---|---|
| S12 | aspheric | 1.8957 | 0.3055 | | | −10.7510 |
| S13 | spherical | infinite | 0.2120 | 1.517 | 64.17 | |
| S14 | spherical | infinite | 0.4002 | | | |
| S15 | spherical | infinite | | | | |

Table 6 shows the high-order coefficients $A_4$, $A_6$, $A_8$, $A_{10}$, $A_{12}$, $A_{14}$, $A_{16}$, $A_{18}$ and $A_{20}$ that can be applied to the spherical or aspheric surfaces S1-S12 of the lenses in Embodiment 2.

TABLE 6

| Surface Number | A4 | A6 | A8 | A10 | A12 |
|---|---|---|---|---|---|
| S1 | −1.1642E−02 | −7.0369E−02 | 1.4637E−01 | −3.3647E−01 | 5.3238E−01 |
| S2 | 4.8545E−02 | −2.1424E−01 | 1.0676E+00 | −4.0897E+00 | 9.9054E+00 |
| S3 | 3.9667E−02 | −9.7466E−02 | −5.9280E−01 | 3.5095E+00 | −1.0366E+01 |
| S4 | 1.2814E−01 | −7.0902E−01 | 2.4830E+00 | −7.3340E+00 | 1.5803E+01 |
| S5 | 1.3716E−01 | −4.7482E−01 | 7.2357E−01 | 2.4458E+00 | −1.9600E+01 |
| S6 | −7.4363E−02 | 4.3769E−01 | −1.6540E+00 | 3.4640E+00 | −3.3290E+00 |
| S7 | −2.4623E−01 | 8.6369E−01 | −2.8945E+00 | 7.0631E+00 | −1.2135E+01 |
| S8 | −1.4904E−01 | 4.6674E−01 | −9.2363E−01 | 1.4222E+00 | −1.6098E+00 |
| S9 | −5.7055E−02 | 1.5452E−02 | 6.0964E−03 | −3.1315E−02 | 6.7240E−02 |
| S10 | −1.0163E−02 | −1.0738E−01 | 2.5265E−01 | −4.1720E−01 | 4.9905E−01 |
| S11 | −3.1047E−01 | 2.1264E−01 | 5.0478E−02 | −2.0406E−01 | 1.8904E−01 |
| S12 | −1.9348E−01 | 1.7833E−01 | −1.1779E−01 | 5.4773E−02 | −1.7875E−02 |

| Surface Number | A14 | A16 | A18 | A20 |
|---|---|---|---|---|
| S1 | −5.1232E−01 | 2.9708E−01 | −9.6613E−02 | 1.3500E−02 |
| S2 | −1.4792E+01 | 1.3315E+01 | −6.5273E+00 | 1.3040E+00 |
| S3 | 1.8874E+01 | −2.1001E+01 | 1.3073E+01 | −3.4802E+00 |
| S4 | −2.0484E+01 | 1.1792E+01 | 1.9451E+00 | −3.8766E+00 |
| S5 | 5.9726E+01 | −9.9302E+01 | 8.8438E+01 | −3.3048E+01 |
| S6 | −1.0028E+00 | 6.3430E+00 | −6.3637E+00 | 2.2091E+00 |
| S7 | 1.4821E+01 | −1.2222E+01 | 6.0471E+00 | −1.3578E+00 |
| S8 | 1.3941E+00 | −9.2171E−01 | 4.0505E−01 | −8.5077E−02 |
| S9 | −6.9021E−02 | 4.4062E−02 | −1.6713E−02 | 2.7410E−03 |
| S10 | −4.0703E−01 | 2.1407E−01 | −6.3055E−02 | 7.7016E−03 |
| S11 | −9.4437E−02 | 2.8147E−02 | −4.8600E−03 | 3.8599E−04 |
| S12 | 3.9914E−03 | −5.8021E−04 | 4.9504E−05 | −1.8843E−06 |

Figure 4A:
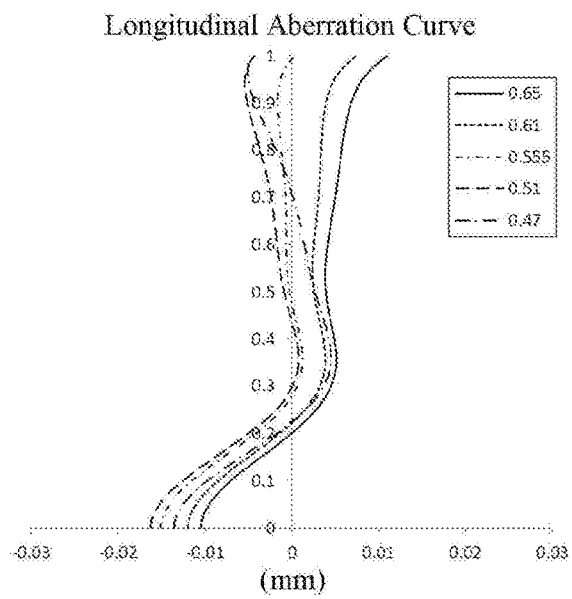
FIG. 4A illustrates a longitudinal aberration curve of the camera lens assembly according to Embodiment 2.
Figure 4B:
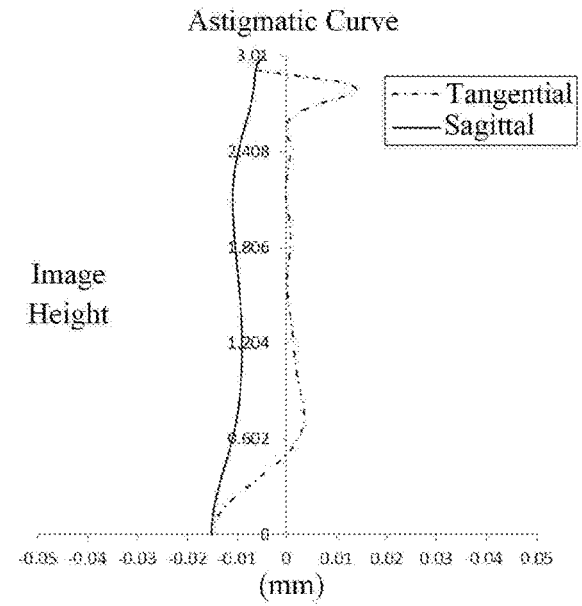
FIG. 4B illustrates an astigmatic curve of the camera lens assembly according to Embodiment 2.
Figure 4C:
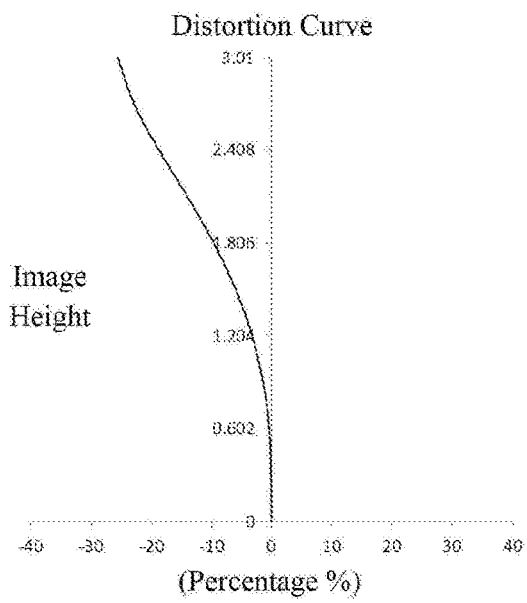
FIG. 4C illustrates a distortion curve of the camera lens assembly according to Embodiment 2.
Figure 4D:
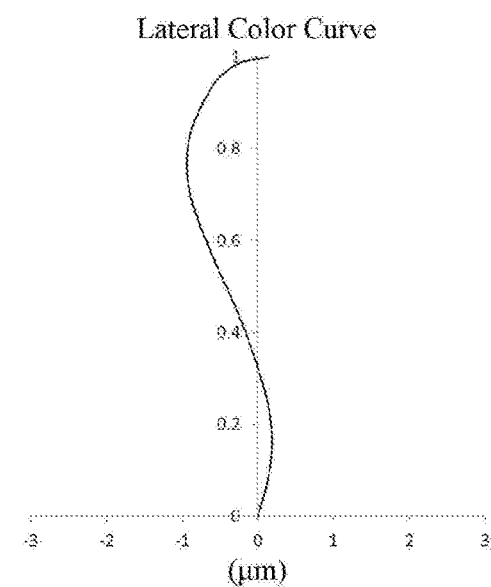
FIG. 4D illustrates a lateral color curve of the camera lens assembly according to Embodiment 2.

FIG. 4A illustrates a longitudinal aberration curve of the camera lens assembly according to Embodiment 2, representing deviations of focal points of light of different wavelengths converged after passing through the optical system. FIG. 4B illustrates an astigmatic curve of the camera lens assembly according to Embodiment 2, representing a curvature of a tangential image plane and a curvature of a sagittal image plane. FIG. 4C illustrates a distortion curve of the camera lens assembly according to Embodiment 2, representing amounts of distortion at different viewing angles. FIG. 4D illustrates a lateral color curve of the camera lens assembly according to Embodiment 2, representing deviations of different image heights on an image plane after light passes through the camera lens assembly. In summary, it can be seen from FIGS. 4A-4D that the camera lens assembly according to Embodiment 2 may achieve a wide-angle imaging effect of a high image quality in a situation where the compactness and the miniaturization of the camera lens assembly are ensured.

Embodiment 3

Figure 5:
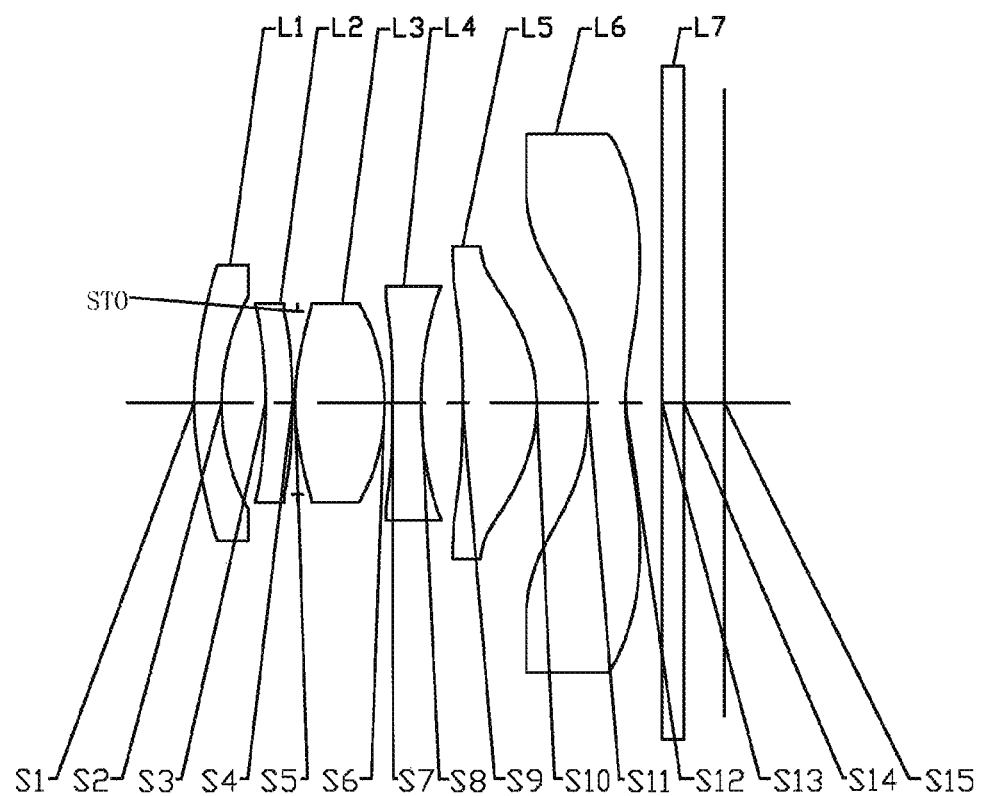
FIG. 5 illustrates a schematic structural diagram of a camera lens assembly according to Embodiment 3 of the present disclosure.

Embodiment 3 of the above camera lens assembly according to the present disclosure will be described below with reference to FIG. 5 to FIG. 6D. FIG. 5 illustrates a schematic structural diagram of a camera lens assembly according to Embodiment 3 of the present disclosure. As shown in FIG. 5, the camera lens assembly according to Embodiment 3 includes the first to sixth lenses L1-L6 respectively having an object side surface and an image side surface.

Table 7 below shows the effective focal lengths of the lenses f1-f6, the total effective focal length of the camera lens assembly f, the half of the maximum field-of-view angle of the camera lens assembly HFOV, the f-number of the camera lens assembly Fno and the total length of the camera lens TTL in Embodiment 3.

TABLE 7

| | Parameter | | | | |
|---|---|---|---|---|---|
| | HFOV (°) | Fno | f (mm) | f1 (mm) | f2 (mm) |
| Numerical Value | 51.712 | 2.12 | 3.118 | −13.312 | −28.003 |

| | Parameter | | | | |
|---|---|---|---|---|---|
| | f3 (mm) | f4 (mm) | f5 (mm) | f6 (mm) | TTL (mm) |
| Numerical Value | 1.879 | −3.888 | 2.680 | −2.000 | 5.200 |

Table 8 shows the surface types, the radii of curvature, the thicknesses, the materials and the conic coefficients of the lenses in Embodiment 3.

TABLE 8

| Surface Number | Surface Type | Radius of Curvature | Thickness | Material Refractive index | Abbe Number | Conic Coefficient |
|---|---|---|---|---|---|---|
| OBJ | spherical | infinite | infinite | | | |
| S1 | aspheric | 2.6319 | 0.2706 | 1.546 | 56.11 | 2.8511 |
| S2 | aspheric | 1.8620 | 0.4313 | | | 0.2140 |
| S3 | aspheric | −3.5608 | 0.2626 | 1.645 | 23.53 | −39.6415 |
| S4 | aspheric | −4.5641 | 0.0502 | | | 14.1000 |
| STO | spherical | infinite | −0.0260 | | | |
| S5 | aspheric | 1.8158 | 0.8775 | 1.546 | 56.11 | −8.9746 |
| S6 | aspheric | −1.9546 | 0.0765 | | | 2.2254 |
| S7 | aspheric | 869.0132 | 0.2800 | 1.645 | 23.53 | −88.8929 |
| S8 | aspheric | 2.4985 | 0.4086 | | | −3.3519 |
| S9 | aspheric | −13.5041 | 0.7271 | 1.536 | 55.80 | −46.9022 |
| S10 | aspheric | −1.3245 | 0.5023 | | | −1.7766 |
| S11 | aspheric | −3.0366 | 0.3666 | 1.536 | 55.80 | 1.3000 |
| S12 | aspheric | 1.7307 | 0.3608 | | | −5.8828 |
| S13 | spherical | infinite | 0.2120 | 1.517 | 64.17 | |
| S14 | spherical | infinite | 0.4000 | | | |
| S15 | spherical | infinite | | | | |

Table 9 shows the high-order coefficients $A_4$, $A_6$, $A_8$, $A_{10}$, $A_{12}$, $A_{14}$, $A_{16}$, $A_{18}$ and $A_{20}$ that can be applied to the spherical or aspheric surfaces S1-S12 of the lenses in Embodiment 3.

TABLE 9

| | Surface Number | | | | |
|---|---|---|---|---|---|
| | A4 | A6 | A8 | A10 | A12 |
| S1 | −6.2418E−02 | 1.0514E−02 | −1.8248E−01 | 5.7788E−01 | −1.0077E+00 |
| S2 | 2.5692E−02 | −3.2640E−01 | 1.5653E+00 | −4.4736E+00 | 7.2450E+00 |
| S3 | 1.4272E−02 | 5.1665E−02 | −1.7875E+00 | 9.1087E+00 | −2.6186E+01 |
| S4 | 1.3614E−01 | −1.2366E+00 | 7.1738E+00 | −2.9033E+01 | 7.8753E+01 |
| S5 | 1.3401E−01 | −9.9319E−01 | 5.5443E+00 | −2.1227E+01 | 5.3227E+01 |
| S6 | −8.2519E−02 | 1.2386E−01 | 6.3683E−01 | −3.5072E+00 | 7.6729E+00 |
| S7 | −2.6624E−01 | 5.7722E−01 | −9.0223E−01 | 5.1845E−01 | 7.3609E−01 |
| S8 | −1.0467E−01 | 1.3195E−01 | 5.1505E−01 | −2.5508E+00 | 5.4780E+00 |
| S9 | −3.9475E−02 | −3.9778E−01 | 2.3582E+00 | −6.8052E+00 | 1.1234E+01 |
| S10 | 1.2093E−03 | −1.6784E−01 | 4.2656E−01 | −8.0782E−01 | 1.0934E+00 |
| S11 | −1.8900E−01 | 1.0491E−01 | 1.1800E−02 | −2.3350E−02 | 1.8255E−03 |
| S12 | −1.7128E−01 | 1.2902E−01 | −6.7402E−02 | 2.3875E−02 | −5.6205E−03 |

| | Surface Number | | | |
|---|---|---|---|---|
| | A14 | A16 | A18 | A20 |
| S1 | 1.0641E+00 | −6.7079E−01 | 2.3222E−01 | −3.4283E−02 |
| S2 | −5.5101E+00 | −2.0341E−01 | 3.1307E+00 | −1.4680E+00 |
| S3 | 4.6027E+01 | −4.8532E+01 | 2.8218E+01 | −6.9669E+00 |
| S4 | −1.3933E+02 | 1.5494E+02 | −9.8409E+01 | 2.7293E+01 |
| S5 | −8.6004E+01 | 8.6084E+01 | −4.8385E+01 | 1.1656E+01 |
| S6 | −8.0261E+00 | 2.8746E+00 | 1.3562E+00 | −1.0154E+00 |
| S7 | −1.2313E+00 | 3.0097E−01 | 4.4495E−01 | −2.4457E−01 |

TABLE 9-continued

| | | | |
|---|---|---|---|
| S8 | −6.8069E+00 | 5.0404E+00 | −2.0658E+00 | 3.6024E−01 |
| S9 | −1.1016E+01 | 6.3618E+00 | −1.9984E+00 | 2.6298E−01 |
| S10 | −9.7256E−01 | 5.4186E−01 | −1.6783E−01 | 2.1649E−02 |
| S11 | 5.9752E−03 | −3.1058E−03 | 6.3334E−04 | −4.7984E−05 |
| S12 | 8.3708E−04 | −7.2961E−05 | 3.2788E−06 | −6.0159E−08 |

Figure 6A:
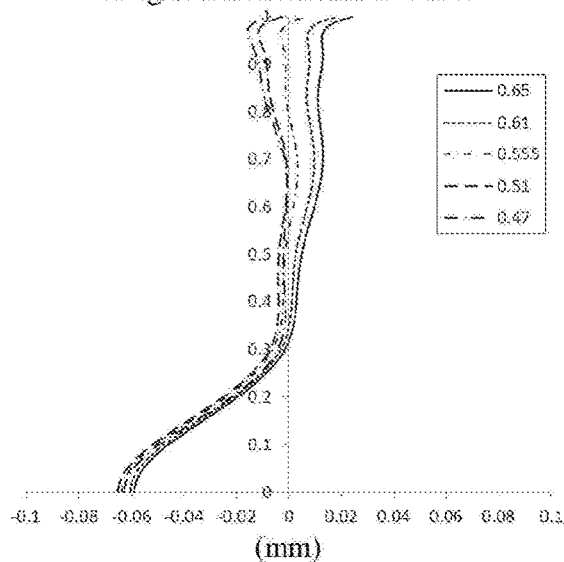
FIG. 6A illustrates a longitudinal aberration curve of the camera lens assembly according to Embodiment 3.
Figure 6B:
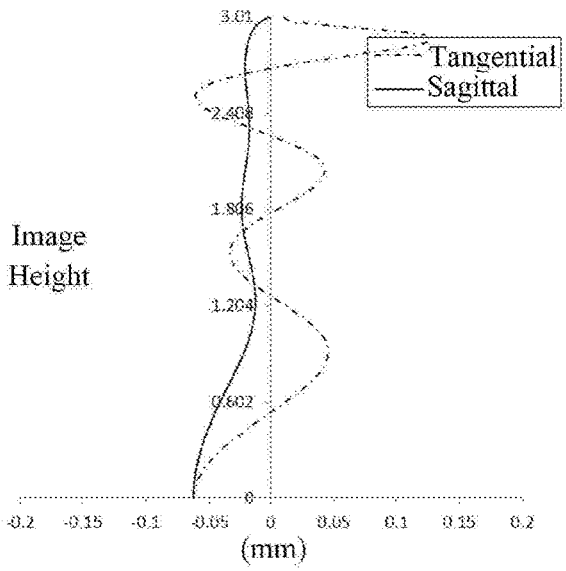
FIG. 6B illustrates an astigmatic curve of the camera lens assembly according to Embodiment 3.
Figure 6C:
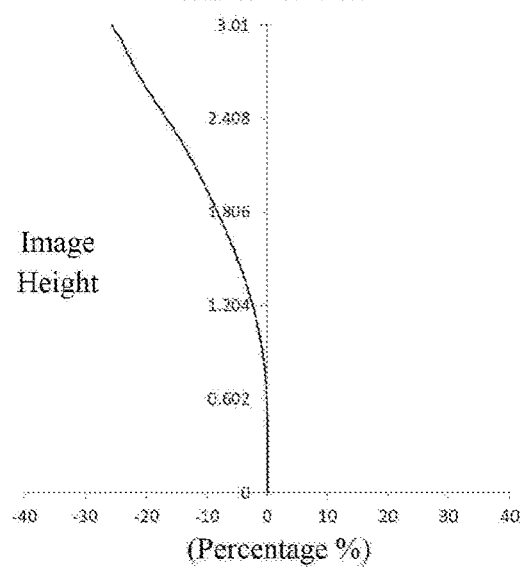
FIG. 6C illustrates a distortion curve of the camera lens assembly according to Embodiment 3.
Figure 6D:
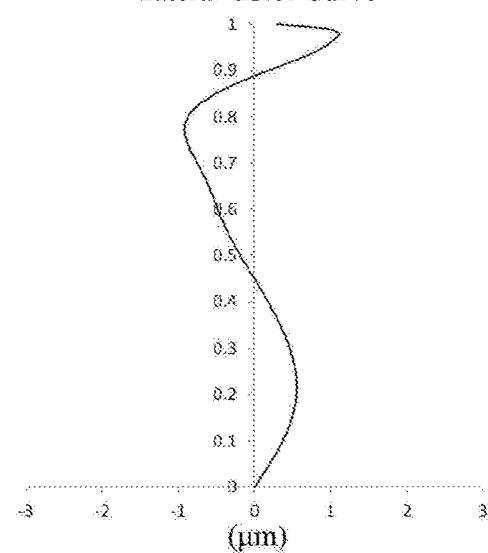
FIG. 6D illustrates a lateral color curve of the camera lens assembly according to Embodiment 3.

FIG. 6A illustrates a longitudinal aberration curve of the camera lens assembly according to Embodiment 3, representing deviations of focal points of light of different wavelengths converged after passing through the optical system. FIG. 6B illustrates an astigmatic curve of the camera lens assembly according to Embodiment 3, representing a curvature of a tangential image plane and a curvature of a sagittal image plane. FIG. 6C illustrates a distortion curve of the camera lens assembly according to Embodiment 3, representing amounts of distortion at different viewing angles. FIG. 6D illustrates a lateral color curve of the camera lens assembly according to Embodiment 3, representing deviations of different image heights on an image plane after light passes through the camera lens assembly. In summary, it can be seen from FIGS. 6A-6D that the camera lens assembly according to Embodiment 3 may achieve a wide-angle imaging effect of a high image quality in a situation where the compactness and the miniaturization of the camera lens assembly are ensured.

Embodiment 4

Figure 7:
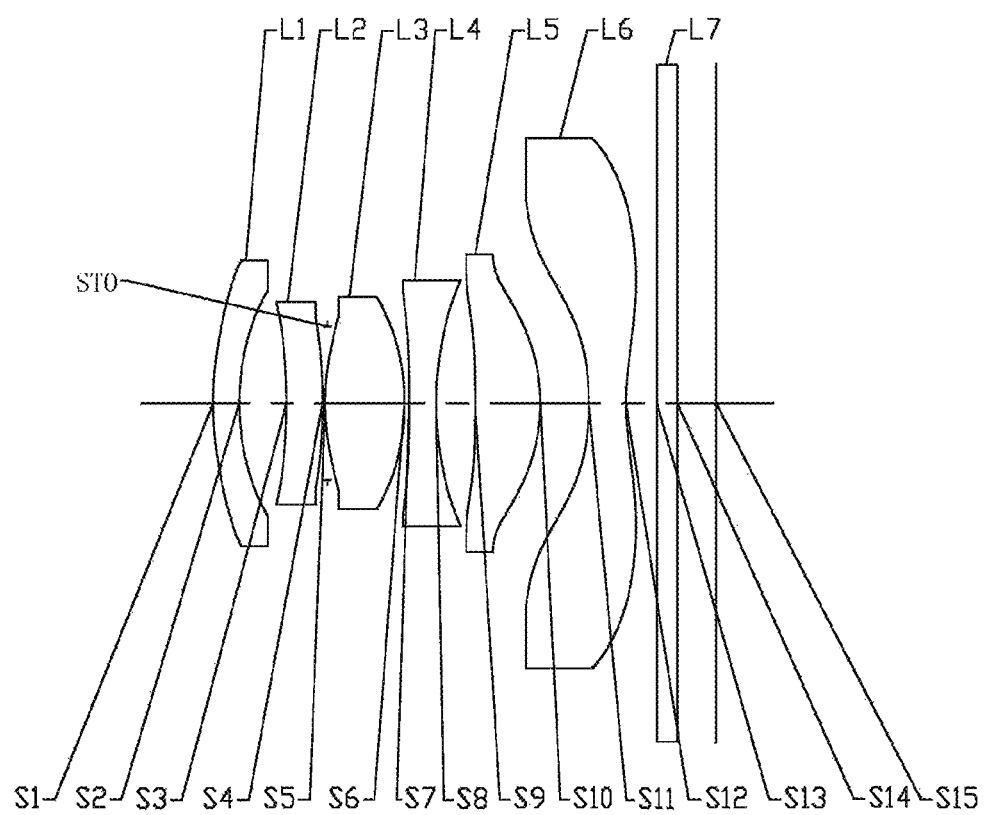
FIG. 7 illustrates a schematic structural diagram of a camera lens assembly according to Embodiment 4 of the present disclosure.

Embodiment 4 of the above camera lens assembly according to the present disclosure will be described below with reference to FIG. 7 to FIG. 8D. FIG. 7 illustrates a schematic structural diagram of a camera lens assembly according to Embodiment 4 of the present disclosure. As shown in FIG. 7, the camera lens assembly according to Embodiment 4 includes the first to sixth lenses L1-L6 respectively having an object side surface and an image side surface.

Table 10 below shows the effective focal lengths of the lenses f1-f6, the half of the maximum field-of-view angle of the camera lens assembly HFOV, the f-number of the camera lens assembly Fno and the total length of the camera lens TTL in Embodiment 4.

TABLE 10

| | Parameter | | | | |
|---|---|---|---|---|---|
| | HFOV (°) | Fno | f (mm) | f1 (mm) | f2 (mm) |
| Numerical Value | 51.242 | 2.56 | 3.179 | −16.356 | 628.909 |

| | Parameter | | | | |
|---|---|---|---|---|---|
| | f3 (mm) | f4 (mm) | f5 (mm) | f6 (mm) | TTL(mm) |
| Numerical Value | 1.909 | −3.508 | 2.894 | −1.975 | 5.200 |

Table 11 shows the surface types, the radii of curvature, the thicknesses, the materials and the conic coefficients of the lenses in Embodiment 4.

TABLE 11

| Surface Number | Surface Type | Radius of Curvature | Thickness | Material | | Conic Coefficient |
|---|---|---|---|---|---|---|
| | | | | Refractive Index | Abbe Number | |
| OBJ | spherical | infinite | infinite | | | |
| S1 | aspheric | 2.5994 | 0.2700 | 1.546 | 56.11 | 2.5698 |
| S2 | aspheric | 1.9395 | 0.4876 | | | 0.6754 |
| S3 | aspheric | −4.0625 | 0.3726 | 1.645 | 23.53 | −21.6225 |
| S4 | aspheric | −4.1668 | 0.0509 | | | 2.9514 |
| STO | spherical | infinite | −0.0232 | | | |
| S5 | aspheric | 1.9504 | 0.8190 | 1.546 | 56.11 | −5.9445 |
| S6 | aspheric | −1.9063 | 0.0500 | | | 1.8418 |
| S7 | aspheric | 2000.0000 | 0.2800 | 1.645 | 23.53 | −94.8154 |
| S8 | aspheric | 2.2585 | 0.4015 | | | −2.0058 |
| S9 | aspheric | −13.4186 | 0.6745 | 1.536 | 55.8 | −39.7783 |
| S10 | aspheric | −1.4168 | 0.5001 | | | −1.4683 |
| S11 | aspheric | −2.6323 | 0.3839 | 1.536 | 55.8 | 0.9137 |
| S12 | aspheric | 1.8660 | 0.3210 | | | −8.1908 |
| S13 | spherical | infinite | 0.2120 | 1.517 | 64.17 | |
| S14 | spherical | infinite | 0.4000 | | | |
| S15 | spherical | infinite | | | | |

Table 12 shows the high-order coefficients $A_4$, $A_6$, $A_8$, $A_{10}$, $A_{12}$, $A_{14}$, $A_{16}$, $A_{18}$ and $A_{20}$ that can be applied to the spherical or aspheric surfaces S1-S12 of the lenses in Embodiment 4.

TABLE 12

| | Surface Number | | | | |
|---|---|---|---|---|---|
| | A4 | A6 | A8 | A10 | A12 |
| S1 | −4.1108E−02 | −3.4107E−02 | 4.4438E−02 | −6.9935E−02 | 9.5203E−02 |
| S2 | 1.2054E−02 | −1.5108E−01 | 7.8724E−01 | −2.9058E+00 | 6.8987E+00 |

TABLE 12-continued

| | | | | | |
|---|---|---|---|---|---|
| S3 | 1.1804E−02 | −3.9168E−02 | −5.8792E−01 | 2.9446E+00 | −7.8459E+00 |
| S4 | 1.6652E−01 | −1.6263E+00 | 9.8493E+00 | −4.1636E+01 | 1.1974E+02 |
| S5 | 2.0542E−01 | −1.7908E+00 | 1.1060E+01 | −4.7821E+01 | 1.4081E+02 |
| S6 | −1.5700E−01 | 9.5938E−01 | −3.6528E+00 | 9.5336E+00 | −1.7475E+01 |
| S7 | −3.1423E−01 | 1.2513E+00 | −4.2705E+00 | 1.0340E+01 | −1.7867E+01 |
| S8 | −1.3682E−01 | 4.4699E−01 | −9.0127E−01 | 1.3718E+00 | −1.6220E+00 |
| S9 | −8.5715E−02 | 4.4397E−02 | −1.3147E−01 | 3.1429E−01 | −3.6523E−01 |
| S10 | −3.8811E−02 | 1.6079E−02 | −3.0824E−01 | 9.9777E−01 | −1.6307E+00 |
| S11 | −2.4680E−01 | 1.7334E−01 | −1.6064E−02 | −4.2035E−02 | 4.5077E−02 |
| S12 | −1.8621E−01 | 1.6405E−01 | −1.0958E−01 | 5.2904E−02 | −1.7954E−02 |

| | Surface Number | | | |
|---|---|---|---|---|
| | A14 | A16 | A18 | A20 |
| S1 | −7.5272E−02 | 3.0301E−02 | −4.8431E−03 | −1.0120E−04 |
| S2 | −1.0158E+01 | 9.0752E+00 | −4.5167E+00 | 9.5979E−01 |
| S3 | 1.2888E+01 | −1.2955E+01 | 7.3602E+00 | −1.8166E+00 |
| S4 | −2.2664E+02 | 2.6929E+02 | −1.8134E+02 | 5.2676E+01 |
| S5 | −2.7516E+02 | 3.4018E+02 | −2.4008E+02 | 7.3547E+01 |
| S6 | 2.2568E+01 | −1.9161E+01 | 9.3921E+00 | −1.9678E+00 |
| S7 | 2.1971E+01 | −1.8000E+01 | 8.6533E+00 | −1.8304E+00 |
| S8 | 1.5601E+00 | −1.1219E+00 | 4.9868E−01 | −9.8810E−02 |
| S9 | 3.3441E−01 | −2.4323E−01 | 1.0740E−01 | −2.0291E−02 |
| S10 | 1.5644E+00 | −8.5051E−01 | 2.4111E−01 | −2.7765E−02 |
| S11 | −2.5473E−02 | 8.2071E−03 | −1.4052E−03 | 9.9670E−05 |
| S12 | 4.1224E−03 | −6.0651E−04 | 5.1472E−05 | −1.9138E−06 |

Figure 8A:
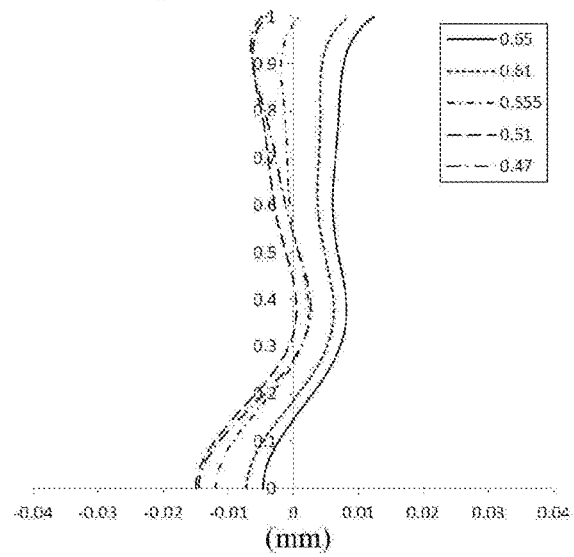
FIG. 8A illustrates a longitudinal aberration curve of the camera lens assembly according to Embodiment 4.
Figure 8B:
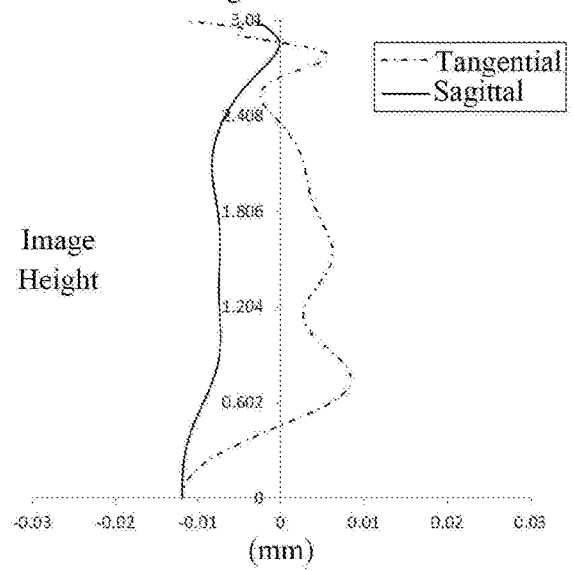
FIG. 8B illustrates an astigmatic curve of the camera lens assembly according to Embodiment 4.
Figure 8C:
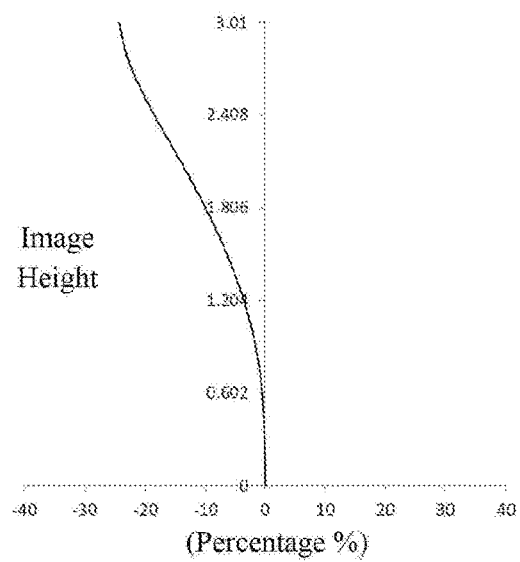
FIG. 8C illustrates a distortion curve of the camera lens assembly according to Embodiment 4.
Figure 8D:
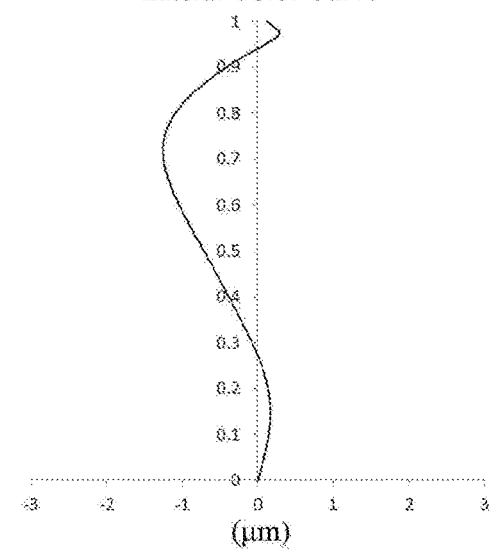
FIG. 8D illustrates a lateral color curve of the camera lens assembly according to Embodiment 4.

FIG. 8A illustrates a longitudinal aberration curve of the camera lens assembly according to Embodiment 4, representing deviations of focal points of light of different wavelengths converged after passing through the optical system. FIG. 8B illustrates an astigmatic curve of the camera lens assembly according to Embodiment 4, representing a curvature of a tangential image plane and a curvature of a sagittal image plane. FIG. 8C illustrates a distortion curve of the camera lens assembly according to Embodiment 4, representing amounts of distortion at different viewing angles. FIG. 8D illustrates a lateral color curve of the camera lens assembly according to Embodiment 4, representing deviations of different image heights on an image plane after light passes through the camera lens assembly. In summary, it can be seen from FIGS. 8A-8D that the camera lens assembly according to Embodiment 4 may achieve a wide-angle imaging effect of a high image quality in a situation where the compactness and the miniaturization of the camera lens assembly are ensured.

Embodiment 5

Figure 9:
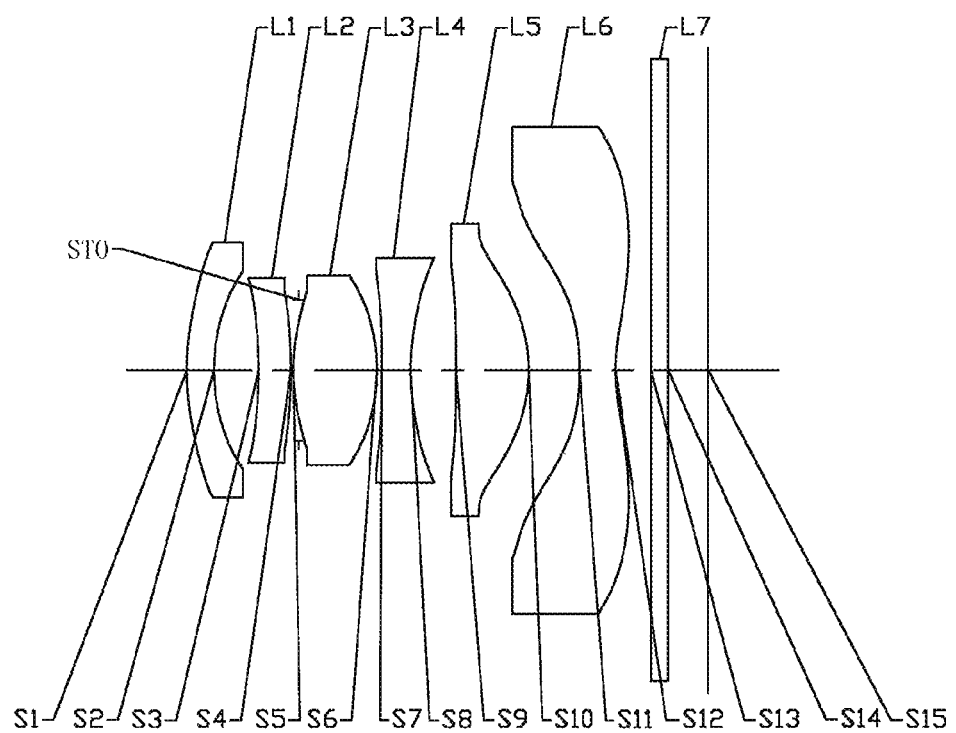
FIG. 9 illustrates a schematic structural diagram of a camera lens assembly according to Embodiment 5 of the present disclosure.

Embodiment 5 of the above camera lens assembly according to the present disclosure will be described below with reference to FIG. 9 to FIG. 10D. FIG. 9 illustrates a schematic structural diagram of a camera lens assembly according to Embodiment 5 of the present disclosure. As shown in FIG. 9, the camera lens assembly according to Embodiment 5 includes the first to sixth lenses L1-L6 respectively having an object side surface and an image side surface.

Table 13 below shows the effective focal lengths of the lenses f1-f6, the total effective focal length of the camera lens assembly f, the half of the maximum field-of-view angle of the camera lens assembly HFOV, the f-number of the camera lens assembly Fno and the total length of the camera lens TTL in Embodiment 5.

TABLE 13

| | Parameter | | | | |
|---|---|---|---|---|---|
| | HFOV (°) | Fno | f (mm) | f1 (mm) | f2 (mm) |
| Numerical Value | 51.177 | 2.55 | 3.146 | −12.044 | −37.008 |

| | Parameter | | | | |
|---|---|---|---|---|---|
| | f3 (mm) | f4 (mm) | f5 (mm) | f6 (mm) | TTL (mm) |
| Numerical Value | 1.860 | −3.654 | 2.729 | −1.993 | 5.200 |

Table 14 shows the surface types, the radii of curvature, the thicknesses, the materials and the conic coefficients of the lenses in Embodiment 5.

TABLE 14

| Surface Number | Surface Type | Radius of Curvature | Thickness | Material | | Conic Coefficient |
|---|---|---|---|---|---|---|
| | | | | Refractive Index | Abbe Number | |
| OBJ | spherical | infinite | infinite | | | |
| S1 | aspheric | 2.6065 | 0.2700 | 1.546 | 56.11 | 2.8503 |
| S2 | aspheric | 1.7983 | 0.4461 | | | 0.5347 |
| S3 | aspheric | −3.7658 | 0.3220 | 1.645 | 23.53 | −41.7371 |
| S4 | aspheric | −4.6215 | 0.0763 | | | 9.3573 |
| STO | spherical | infinite | −0.0536 | | | |
| S5 | aspheric | 1.8388 | 0.8338 | 1.546 | 56.11 | −8.0730 |
| S6 | aspheric | −1.9040 | 0.0500 | | | 2.0248 |

TABLE 14-continued

| Surface Number | Surface Type | Radius of Curvature | Thickness | Material Refractive Index | Abbe Number | Conic Coefficient |
|---|---|---|---|---|---|---|
| S7 | aspheric | 97.5633 | 0.2891 | 1.645 | 23.53 | −8.89E+01 |
| S8 | aspheric | 2.2972 | 0.4488 | | | −3.1764 |
| S9 | aspheric | 1000.0000 | 0.7266 | 1.536 | 55.80 | 95.0052 |
| S10 | aspheric | −1.4666 | 0.5074 | | | −1.8260 |
| S11 | aspheric | −2.8754 | 0.3610 | 1.536 | 55.80 | 1.2345 |
| S12 | aspheric | 1.7787 | 0.3525 | | | −7.9506 |
| S13 | spherical | infinite | 0.1700 | 1.517 | 64.17 | |
| S14 | spherical | infinite | 0.4000 | | | |
| S15 | spherical | infinite | | | | |

Table 15 shows the high-order coefficients $A_4$, $A_6$, $A_8$, $A_{10}$, $A_{12}$, $A_{14}$, $A_{16}$, $A_{18}$ and $A_{20}$ that can be applied to the spherical or aspheric surfaces S1-S12 of the lenses in Embodiment 5.

TABLE 15

| | Surface Number | | | | |
|---|---|---|---|---|---|
| | A4 | A6 | A8 | A10 | A12 |
| S1 | −4.8479E−02 | −4.3679E−02 | 6.1802E−02 | −1.0562E−01 | 1.5614E−01 |
| S2 | 1.4056E−02 | −1.9023E−01 | 1.0703E+00 | −4.2661E+00 | 1.0937E+01 |
| S3 | 1.3106E−02 | −4.5824E−02 | −7.2477E−01 | 3.8250E+00 | −1.0739E+01 |
| S4 | 1.7464E−01 | −1.7466E+00 | 1.0832E+01 | −4.6894E+01 | 1.3811E+02 |
| S5 | 1.9280E−01 | −1.6283E+00 | 9.7424E+00 | −4.0809E+01 | 1.1641E+02 |
| S6 | −1.6485E−01 | 1.0323E+00 | −4.0276E+00 | 1.0772E+01 | −2.0233E+01 |
| S7 | −3.1677E−01 | 1.2665E+00 | −4.3399E+00 | 1.0551E+01 | −1.8304E+01 |
| S8 | −1.3448E−01 | 4.3555E−01 | −8.7065E−01 | 1.3138E+00 | −1.5400E+00 |
| S9 | −6.3908E−02 | 1.5052E−02 | 1.9535E−03 | −6.0844E−02 | 1.9465E−01 |
| S10 | −3.1291E−02 | 1.1640E−02 | −2.0036E−01 | 5.8237E−01 | −8.5462E−01 |
| S11 | −2.1251E−01 | 1.3850E−01 | −1.1910E−02 | −2.8920E−02 | 2.8778E−02 |
| S12 | −1.5122E−01 | 1.2006E−01 | −7.2273E−02 | 3.1444E−02 | −9.6164E−03 |
| | Surface Number | | | |
| | A14 | A16 | A18 | A20 |
| S1 | −1.3407E−01 | 5.8608E−02 | −1.0173E−02 | −2.3084E−04 |
| S2 | −1.7389E+01 | 1.6776E+01 | −9.0158E+00 | 2.0688E+00 |
| S3 | 1.8588E+01 | −1.9689E+01 | 1.1786E+01 | −3.0653E+00 |
| S4 | −2.6769E+02 | 3.2573E+02 | −2.2463E+02 | 6.6820E+01 |
| S5 | −2.2038E+02 | 2.6395E+02 | −1.8047E+02 | 5.3560E+01 |
| S6 | 2.6775E+01 | −2.3295E+01 | 1.1700E+01 | −2.5120E+00 |
| S7 | 2.2599E+01 | −1.8590E+01 | 8.9729E+00 | −1.9057E+00 |
| S8 | 1.4685E+00 | −1.0470E+00 | 4.6136E−01 | −9.0629E−02 |
| S9 | −2.1696E−01 | 1.1728E−01 | −3.1029E−02 | 3.0681E−03 |
| S10 | 7.3618E−01 | −3.5937E−01 | 9.1479E−02 | −9.4588E−03 |
| S11 | −1.5090E−02 | 4.5116E−03 | −7.1679E−04 | 4.7178E−05 |
| S12 | 1.9898E−03 | −2.6382E−04 | 2.0177E−05 | −6.7605E−07 |

Figure 10A:
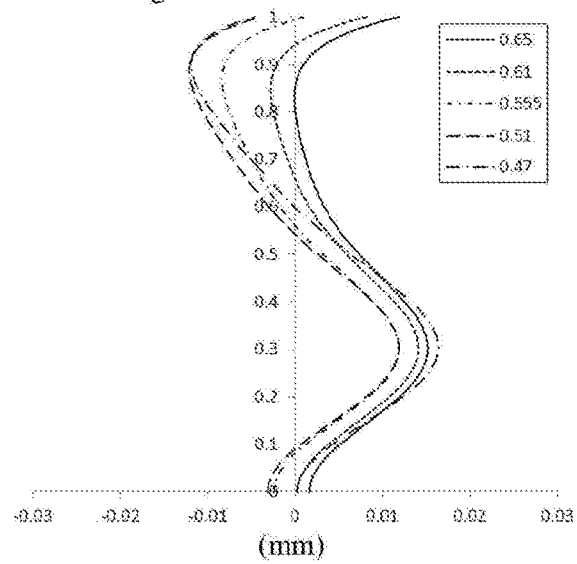
FIG. 10A illustrates a longitudinal aberration curve of the camera lens assembly according to Embodiment 5.
Figure 10B:
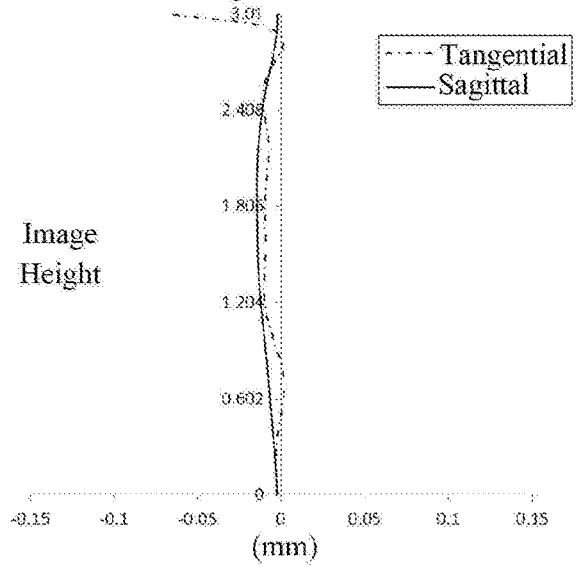
FIG. 10B illustrates an astigmatic curve of the camera lens assembly according to Embodiment 5.
Figure 10C:
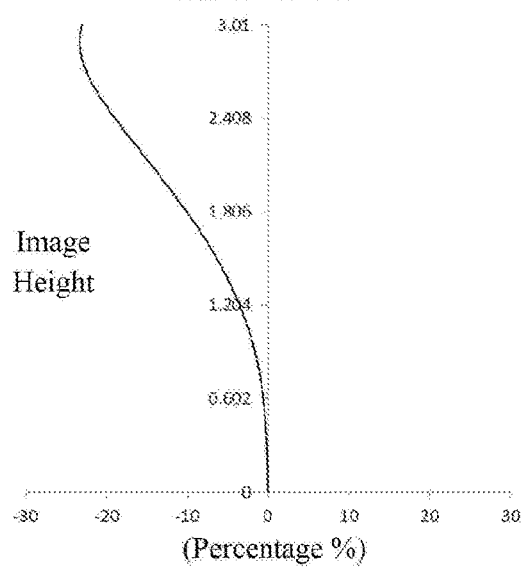
FIG. 10C illustrates a distortion curve of the camera lens assembly according to Embodiment 5.
Figure 10D:
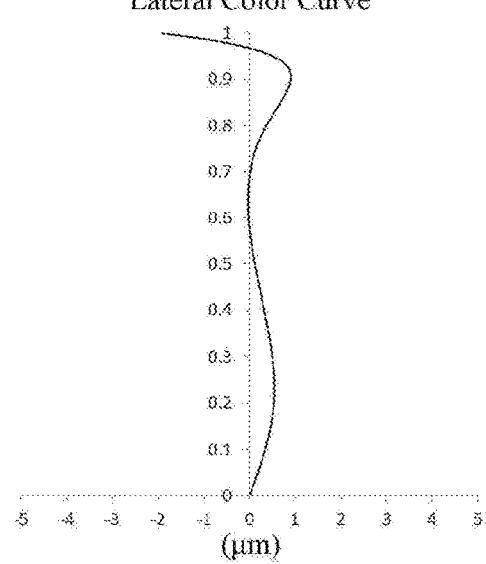
FIG. 10D illustrates a lateral color curve of the camera lens assembly according to Embodiment 5.

FIG. 10A illustrates a longitudinal aberration curve of the camera lens assembly according to Embodiment 5, representing deviations of focal points of light of different wavelengths converged after passing through the optical system. FIG. 10B illustrates an astigmatic curve of the camera lens assembly according to Embodiment 5, representing a curvature of a tangential image plane and a curvature of a sagittal image plane. FIG. 10C illustrates a distortion curve of the camera lens assembly according to Embodiment 5, representing amounts of distortion at different viewing angles. FIG. 10D illustrates a lateral color curve of the camera lens assembly according to Embodiment 5, representing deviations of different image heights on an image plane after light passes through the camera lens assembly. In summary, it can be seen from FIGS. 10A-10D that the camera lens assembly according to Embodiment 5 may achieve a wide-angle imaging effect of a high image quality in a situation where the compactness and the miniaturization of the camera lens assembly are ensured.

To sum up, with reference to Tables 1-15, the parameters in Embodiments 1-5 may respectively satisfy the relations shown in Table 16 below.

TABLE 16

| Conditional expression | Embodiment | | | | |
|---|---|---|---|---|---|
| | 1 | 2 | 3 | 4 | 5 |
| f1/f3 | −8.137 | −8.317 | −7.086 | −8.568 | −6.476 |
| DT11/DT21 | 1.346 | 1.360 | 1.378 | 1.411 | 1.382 |
| R1/R5 | 1.296 | 1.324 | 1.449 | 1.333 | 1.417 |
| f1/f | −4.858 | −4.879 | −4.269 | −5.145 | −3.828 |
| f6/f | −0.605 | −0.574 | −0.641 | −0.621 | −0.634 |
| CT1/CT2 | 0.717 | 0.767 | 1.030 | 0.725 | 0.839 |
| CT3/CT5 | 1.040 | 0.924 | 1.207 | 1.214 | 1.148 |
| R1/R11 | −1.000 | −1.125 | −0.867 | −0.987 | −0.906 |

TABLE 16-continued

| Conditional expression | Embodiment | | | | |
|---|---|---|---|---|---|
| | 1 | 2 | 3 | 4 | 5 |
| TTL/ImgH | 1.728 | 1.728 | 1.728 | 1.728 | 1.728 |
| T12/T45 | 1.026 | 1.060 | 1.056 | 1.214 | 0.994 |
| T45/T56 | 0.864 | 0.902 | 0.813 | 0.803 | 0.885 |
| DT11/ImgH | 0.397 | 0.399 | 0.406 | 0.421 | 0.409 |

The present disclosure further provides a camera device, having a photosensitive element which may be a photosensitive charge-coupled device (CCD) or a complementary metal-oxide semiconductor (CMOS) element. The camera device may be an independent camera device such as a distance detecting camera, or may be a camera module integrated in a device such as a distance detecting device. The camera device is equipped with the camera lens assembly described above.

The foregoing descriptions are merely illustrations of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, for example, technical solutions formed by replacing the above features as disclosed in the present disclosure with (but not limited to) technical features having similar functions.

What is claimed is:

1. A camera lens assembly, comprising sequentially a first lens, a second lens, a third lens, a fourth lens, a fifth lens and a sixth lens from an object side to an image side along an optical axis,
    wherein the first lens has a negative refractive power, and an object side surface of the first lens is a convex surface;
    the third lens has a positive refractive power, and an object side surface of the third lens is a convex surface;
    the sixth lens has a negative refractive power, and an image side surface of the sixth lens is a concave surface;
    the second lens, the fourth lens and the fifth lens respectively have a positive refractive power or a negative refractive power; and
    an effective radius of the object side surface of the first lens DT11 and an effective radius of an object side surface of the second lens DT21 satisfy: 1<DT11/DT21<1.5,
    wherein an effective focal length of the first lens f1 and an effective focal length of the third lens f3 satisfy: −10<f1/f3<−5, and
    wherein an object side surface of the sixth lens is a concave surface, and a radius of curvature of the object side surface of the first lens R1 and a radius of curvature of the object side surface of the sixth lens R11 satisfy: −1.2<R1/R11<−0.7.

2. The camera lens assembly according to claim 1, wherein a radius of curvature of the object side surface of the first lens R1 and a radius of curvature of the object side surface of the third lens R5 satisfy: 1<R1/R5<1.5.

3. The camera lens assembly according to claim 1, wherein a distance from the object side surface of the first lens to an image plane on the optical axis TTL and half a diagonal length of an effective pixel area of an electronic photosensitive element ImgH, satisfy: TTL/ImgH<1.8.

4. The camera lens assembly according to any one of claim 1, wherein the effective radius of the object side surface of the first lens DT11 and half the diagonal length of an effective pixel area of an electronic photosensitive element ImgH, satisfy: 0.3<DT11/ImgH<0.6.

5. The camera lens assembly according to any one of claim 1, wherein a center thickness of the first lens on the optical axis CT1 and a center thickness of the second lens on the optical axis CT2 satisfy: 0.6<CT1/CT2<1.2.

6. The camera lens assembly according to any one of claim 1, wherein a center thickness of the third lens on the optical axis CT3 and a center thickness of the fifth lens on the optical axis CT5 satisfy: 0.8<CT3/CT5<1.3.

7. The camera lens assembly according to any one of claim 1, wherein a spacing distance between the first lens and the second lens on the optical axis and a spacing distance between the fourth lens and the fifth lens on the optical axis T45 satisfy: 0.8<T12/T45<1.3.

8. The camera lens assembly according to claim 1, wherein an effective focal length of the first lens f1 and an effective focal length of the camera lens assembly f satisfy: −6<f1/f<−3.

9. A camera lens assembly, comprising sequentially a first lens, a second lens, a third lens, a fourth lens, and multiple subsequent lenses from an object side to an image side along an optical axis,
    wherein the first lens has a negative refractive power, and an object side surface of the first lens is a convex surface;
    the third lens has a positive refractive power, and an object side surface of the third lens is a convex surface;
    the second lens and the fourth lens respectively have a positive refractive power or a negative refractive power; and
    an effective focal length of the first lens f1 and an effective focal length of the camera lens assembly f satisfy: −6<f1/f<−3,
    wherein an object side surface of the sixth lens is a concave surface, and a radius of curvature of the object side surface of the first lens R1 and a radius of curvature of the object side surface of the sixth lens R11 satisfy: −1.2<R1/R11<−0.7.

10. The camera lens assembly according to claim 9, wherein a radius of curvature of the object side surface of the first lens R1 and a radius of curvature of the object side surface of the third lens R5 satisfy: 1<R1/R5<1.5.

11. The camera lens assembly according to claim 9, wherein the subsequent lenses include a fifth lens and a sixth lens sequentially arranged between the fourth lens and the image side, and an effective focal length of the sixth lens f6 and the effective focal length of the camera lens assembly f satisfy: −1<f6/f<−0.5.

12. The camera lens assembly according to claim 9, wherein a distance from the object side surface of the first lens to an image plane on the optical axis TTL and half a diagonal length of an effective pixel area of an electronic photosensitive element ImgH, satisfy: TTL/ImgH<1.8.

13. The camera lens assembly according to claim 9, wherein the effective radius of the object side surface of the first lens DT11 and half a diagonal length of an effective pixel area of an electronic photosensitive element ImgH, satisfy: 0.3<DT11/ImgH<0.6.

14. The camera lens assembly according to claim 9, wherein a center thickness of the first lens on the optical axis CT1 and a center thickness of the second lens on the optical axis CT2 satisfy: $0.6<CT1/CT2<1.2$.

15. The camera lens assembly according to claim 11, wherein a center thickness of the third lens on the optical axis CT3 and a center thickness of the fifth lens on the optical axis CT5 satisfy: $0.8<CT3/CT5<1.3$.

16. The camera lens assembly according to claim 9, wherein an image side surface of the first lens is a concave surface, and an image side surface of the third lens is a convex surface.

17. The camera lens assembly according to claim 11, wherein a spacing distance between the fourth lens and the fifth lens on the optical axis T45 and a spacing distance between the fifth lens and the sixth lens on the optical axis T56 satisfy: $0.5<T45/T56<1$.

18. The camera lens assembly according to claim 9, wherein the effective focal length of the first lens f1 and the effective focal length of the camera lens assembly f further satisfy: $-5.145<f1/f<-3.828$.

19. The camera lens assembly according to claim 9, wherein the radius of curvature of the object side surface of the first lens R1 and the radius of curvature of the object side surface of the sixth lens R11 satisfy: $-1.125<R1/R11<-0.867$.

* * * * *